(No Model.)
W. BECK.
PLUNGER FOR PRESSING GLASS.
No. 301,329. Patented July 1, 1884.
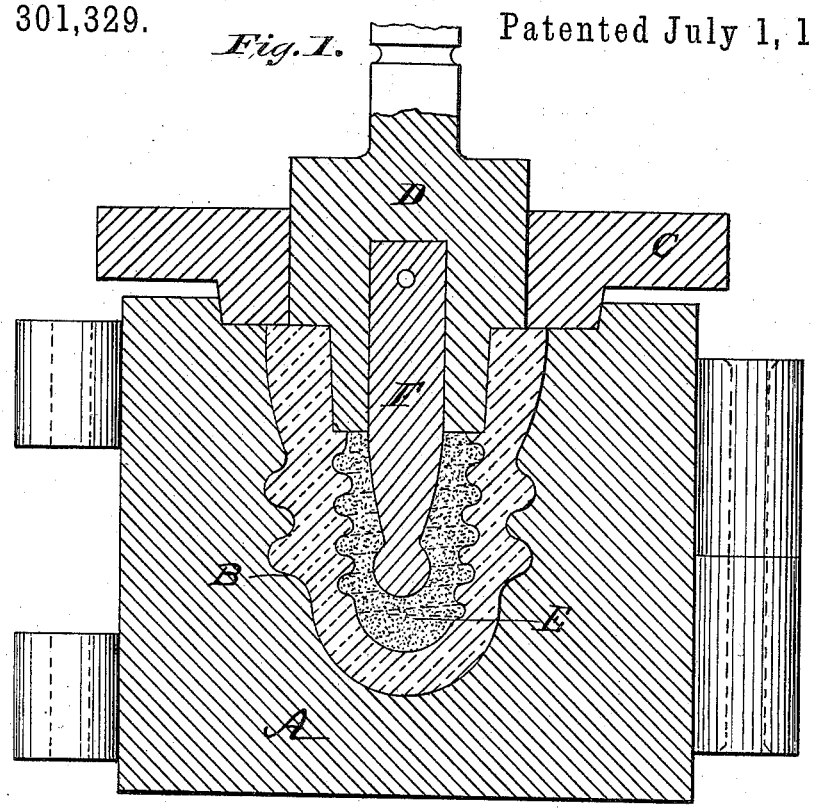
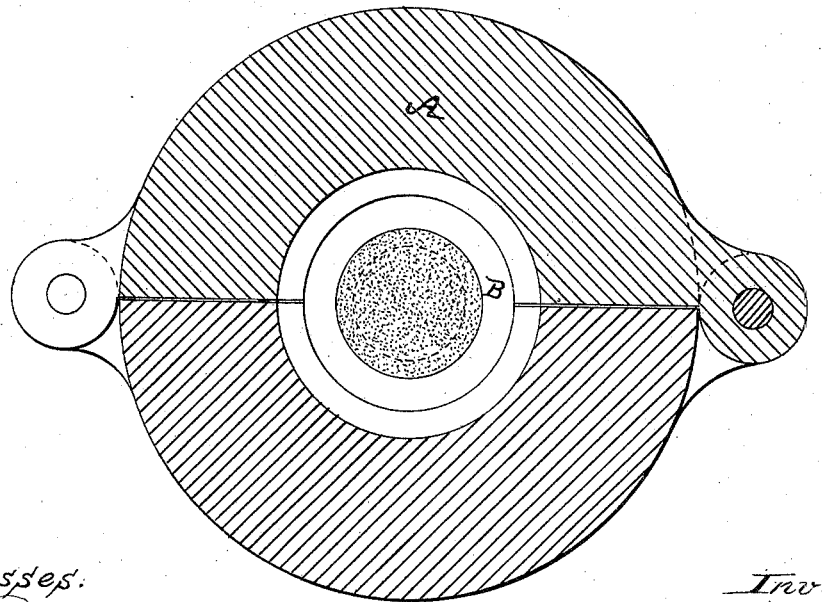
Witnesses:
T. C. Brecht
G. S. Rafter
Inventor:
Washington Beck
By L. W. Finsabaugh
Attorney.

UNITED STATES PATENT OFFICE.

WASHINGTON BECK, OF PITTSBURG, PENNSYLVANIA.

PLUNGER FOR PRESSING GLASS.

SPECIFICATION forming part of Letters Patent No. 301,329, dated July 1, 1884.

Application filed May 10, 1884. (No model.)

*To all whom it may concern:*

Be it known that I, WASHINGTON BECK, a citizen of the United States, residing at Pittsburg, in the county of Allegheny and State of Pennsylvania, have invented certain new and useful Improvements in Plungers for Pressing Glass, of which the following is a specification, reference being had therein to the accompanying drawings.

My invention relates to plungers for forming glass articles of irregular shape.

The object of my invention is to provide a plunger for pressing glass articles having irregular or uneven surfaces.

My invention consists in making the plungers of plaster-of-paris or other equivalent material, said plungers being made to conform to the desired shape or configuration to be given to the interior of the article.

My invention consists, further, in strengthening said plungers with an internal support of wood or metal, and adapting it to be readily attached to or detached from the piston or plunger head of the press, so that the article with the plunger therein can be readily removed from the mold and press.

Figure 1 is a vertical sectional view of a mold with the article and plunger therein. Fig. 2 is a horizontal sectional view.

In the manufacture of pressed articles of glass having irregular internal surfaces, as heretofore practiced, it is common to use metallic plungers having screw-threads formed on the periphery of the plunger, so that by forcing the plunger into the molten glass contained in the mold and then turning the plunger to unscrew it from the article screw-threads will be formed on the inside of the article, as in the making of telegraph-insulators. Plungers have also been provided with portions adapted to be projected from or retracted within, so as to form lugs or recesses on the interior of the article, as in the manufacture of caps for fruit-jars and the like, so that the formation of pressed articles of glass having irregular internal surfaces has necessarily been confined within narrow limits.

In practicing my invention I am enabled to press all kinds of hollow articles having irregular or varying internal surfaces, which I will now proceed to describe in full, with reference to the drawings hereto annexed, in which I have shown, for convenience of illustration, a mold and plunger adapted to make the ordinary internally-screw-threaded telegraph-insulator.

A is the mold, of usual construction, hinged together in two or more parts, and having therein the article-forming cavity B, which may be of any desired form or configuration.

C is the usual mold-ring to hold or confine the glass within the mold while the pressure is being exerted.

D is the plunger rod or piston of the press, to which is detachably secured the plunger E.

The plunger E consists of an internal support or bar, F, adapted to be readily attached to and detached from the plunger-rod D by any suitable means.

Around the lower end of the bar F is cast or otherwise formed the portion of the plunger which gives form and shape to the interior of the article. This portion of the plunger is made of plaster-of-paris, clay of any kind, asbestus, or any suitable material which can be readily picked to pieces and removed from the article after it is formed. I prefer, however, to use plaster-of-paris, as the heat of the glass will in a measure calcine it, causing it to contract and crumble when cold, and be more readily removed from the article either before or after the article has been annealed. These plungers, as above intimated, are designed to be used only once, as they are broken and removed from the article in pieces. The interior of the plungers may be provided with springs or other slightly-yielding device or substance, so that in the contraction of the glass the plaster-of-paris will yield without breaking the article.

As before stated, I have shown my improved plunger as applied to the manufacture of screw-threaded telegraph-insulators; but I do not limit myself to this use, as it is obvious that it can be used to press any kind of glass articles, and especially designed for use in pressing articles having an irregular or uneven internal cavity or surface. Pitchers with two or more swells, articles such as cylinders in which a cross-piece of glass integral therewith is desired, can be made on this plan by simply making an opening through the plunger at right angles to the axis thereof. By the use of plungers as thus constructed I am enabled to press perfect cylinders or tubes from glass or other articles having perfectly straight internal faces. Articles having offsets or designs can be readily formed, and ornaments—as cameos or other designs—may be secured to the plunger and embedded in the interior of the glass, care being exercised to form recesses, marees, or dovetailed edges, so that the glass will gather around the ornament and hold the same in position.

I do not limit myself to any particular form of plunger, or to the manufacture of any particular form of articles; neither do I limit myself to the manufacture of articles having irregular or uneven surfaces, as it is obvious that a plunger of the ordinary shape can be made from the materials and in the manner herein described, and used to good advantage, without crizzeling or injuring the glass, as is frequently the case when the ordinary metal plunger is used.

Having thus described my invention, what I claim, and desire to secure by Letters Patent, is—

1. A plunger for forming or pressing glass articles made of plaster-of-paris or other similar material, as set forth.

2. A plunger for pressing or forming glass articles having an irregular or uneven interior, made of plaster-of-paris or other like material, and having an internal support, by which said plunger is strengthened and secured to the piston of the press, as set forth.

3. The method herein described of forming articles of glass having an irregular interior by pressing in a mold with a plunger made of plaster-of-paris, or its described equivalent, and after the article has set or hardened removing said plunger in pieces or fragments from the article, as set forth.

In testimony whereof I affix my signature in presence of two witnesses.

WASHINGTON BECK.

Witnesses:
J. M. YZNAGA,
GUY L. DE MOTTE.